(12) United States Patent
Kray et al.

(10) Patent No.: US 10,589,475 B2
(45) Date of Patent: Mar. 17, 2020

(54) BRAIDED BLADES AND VANES HAVING DOVETAIL ROOTS

(71) Applicant: GENERAL ELECTRIC COMPANY, Schenectady, NY (US)

(72) Inventors: Nicholas Joseph Kray, West Chester, OH (US); Xiaomei Fang, Niskayuna, NY (US); Christopher Madsen, Garching b. Munchen (DE); Ian Francis Prentice, Cincinnati, OH (US); Sultan Shair, Ismaning (DE); Dong-Jin Shim, Niskayuna, NY (US); Douglas Duane Ward, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 958 days.

(21) Appl. No.: 14/860,132

(22) Filed: Sep. 21, 2015

(65) Prior Publication Data

US 2016/0201478 A1 Jul. 14, 2016

Related U.S. Application Data

(60) Provisional application No. 62/053,835, filed on Sep. 23, 2014.

(51) Int. Cl.
*F01D 5/14* (2006.01)
*B29C 70/24* (2006.01)
(Continued)

(52) U.S. Cl.
CPC .............. *B29C 70/24* (2013.01); *F01D 5/147* (2013.01); *F01D 5/282* (2013.01); *F01D 9/041* (2013.01);
(Continued)

(58) Field of Classification Search
CPC ........... F01D 5/147; F01D 5/282; F01D 9/041
See application file for complete search history.

(56) References Cited

U.S. PATENT DOCUMENTS

| 3,426,804 A | 2/1969 | Bluck |
| 4,312,761 A | 1/1982 | Gitchel |

(Continued)

FOREIGN PATENT DOCUMENTS

| CN | 101208191 A | 6/2008 |
| CN | 102588333 A | 7/2012 |

(Continued)

OTHER PUBLICATIONS

Unofficial English Translation of Chinese Office Action issued in connection with corresponding CN Application No. 201510859750.9 dated Feb. 4, 2017.

(Continued)

*Primary Examiner* — Woody A Lee, Jr.
*Assistant Examiner* — Sabbir Hasan
(74) *Attorney, Agent, or Firm* — Dority & Manning, P.A.

(57) ABSTRACT

A gas turbine engine composite article having a composite article airfoil extending outwardly to an article root to an article airfoil tip. Within the article airfoil is a core including a core airfoil attached to a core root including a core dovetail. A continuous outer three-dimensional braided layer including braided composite material tows are braided on the core and the braided layer covers the entire core airfoil and the core root. The core may be an inflatable mandrel or a composite core made of a composite material. The core may include stiffeners such as an I beam or hollow rectangular cross-section box beams. A method for making such an article includes braiding a continuous outer three-dimensional braided layer including braided composite material tows on the core including covering the entire core airfoil (Continued)

and the core root with the continuous outer three-dimensional braided layer.

14 Claims, 9 Drawing Sheets

(51) Int. Cl.
*F01D 9/04* (2006.01)
*F01D 25/00* (2006.01)
*F01D 5/28* (2006.01)
*B29C 70/44* (2006.01)
*B29C 70/48* (2006.01)

(52) U.S. Cl.
CPC ............ *F01D 25/005* (2013.01); *B29C 70/44* (2013.01); *B29C 70/48* (2013.01); *F05D 2220/32* (2013.01); *F05D 2220/36* (2013.01); *F05D 2230/30* (2013.01); *F05D 2240/80* (2013.01); *F05D 2300/603* (2013.01); *F05D 2300/6034* (2013.01); *Y02T 50/672* (2013.01)

(56) References Cited

U.S. PATENT DOCUMENTS

| | | | |
|---|---|---|---|
| 5,013,216 A | | 5/1991 | Bailey et al. |
| 5,049,036 A | | 9/1991 | Bailey et al. |
| 5,279,892 A | | 1/1994 | Baldwin et al. |
| 5,340,280 A | | 8/1994 | Schilling |
| 5,375,978 A | | 12/1994 | Evans et al. |
| 5,403,153 A | * | 4/1995 | Goetze .................... B29C 70/86 416/229 A |
| 5,569,019 A | | 10/1996 | Katariya et al. |
| 5,624,618 A | | 4/1997 | Forman et al. |
| 7,165,945 B2 | | 1/2007 | Viola et al. |
| 7,753,653 B2 | | 7/2010 | Cairo et al. |
| 8,061,253 B2 | | 11/2011 | Wybrow |
| 8,297,934 B2 | | 10/2012 | Lutz et al. |
| 8,387,504 B2 | * | 3/2013 | Cairo .................... B22D 19/14 87/1 |
| 9,523,280 B2 | * | 12/2016 | Pilpel ..................... F03D 3/062 |
| 2010/0144227 A1 | | 6/2010 | Coupe et al. |
| 2012/0177501 A1 | | 7/2012 | Cairo et al. |
| 2012/0301299 A1 | | 11/2012 | Sherrill et al. |
| 2013/0052004 A1 | | 2/2013 | Stilin |
| 2014/0023512 A1 | | 1/2014 | Pilpel et al. |

FOREIGN PATENT DOCUMENTS

| | | |
|---|---|---|
| CN | 103209890 A | 7/2013 |
| CN | 103628923 A | 3/2014 |
| EP | 1681440 B1 | 7/2006 |
| EP | 2458153 A2 | 5/2012 |
| EP | 2607628 A2 | 6/2013 |
| WO | 2012001279 A1 | 1/2012 |
| WO | 2014/070381 A1 | 5/2014 |
| WO | 2014070381 A1 | 5/2014 |

OTHER PUBLICATIONS

European Search Report and Written Opinion issued in connection with corresponding EP Application No. 15186194.5 dated Mar. 3, 2016.

Machine Translation and Fourth office action and search issued in connection with corresponding CN Application No. 201510859750.9 dated Nov. 30, 2018 (Office action translation is not available).

* cited by examiner

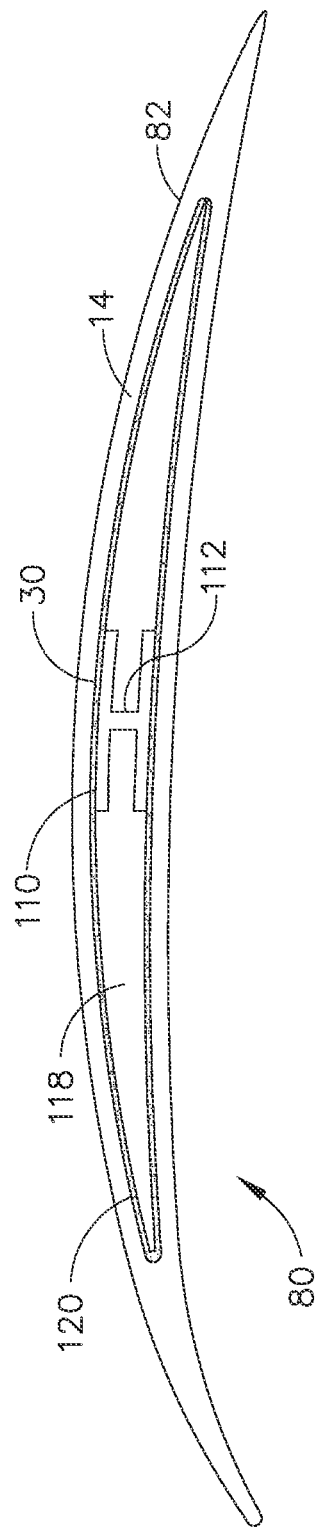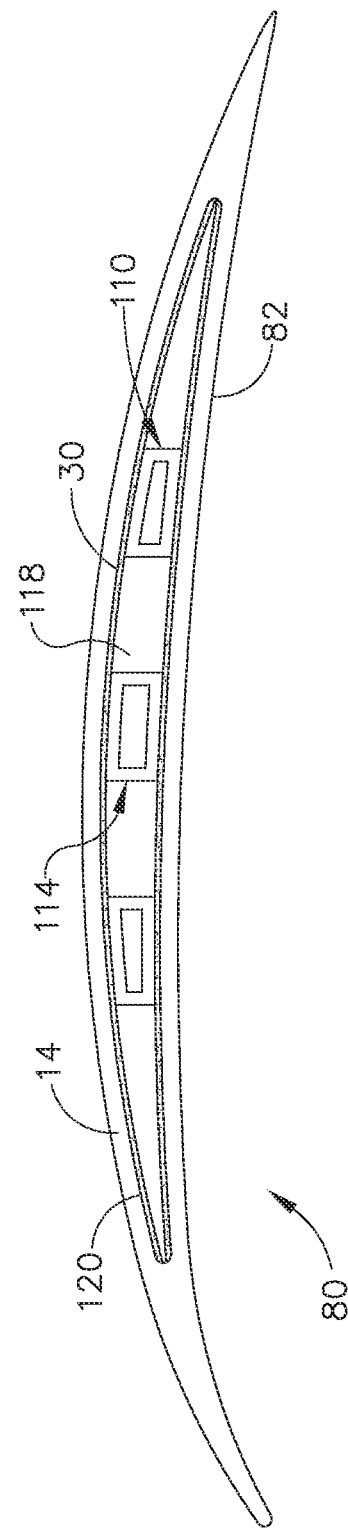

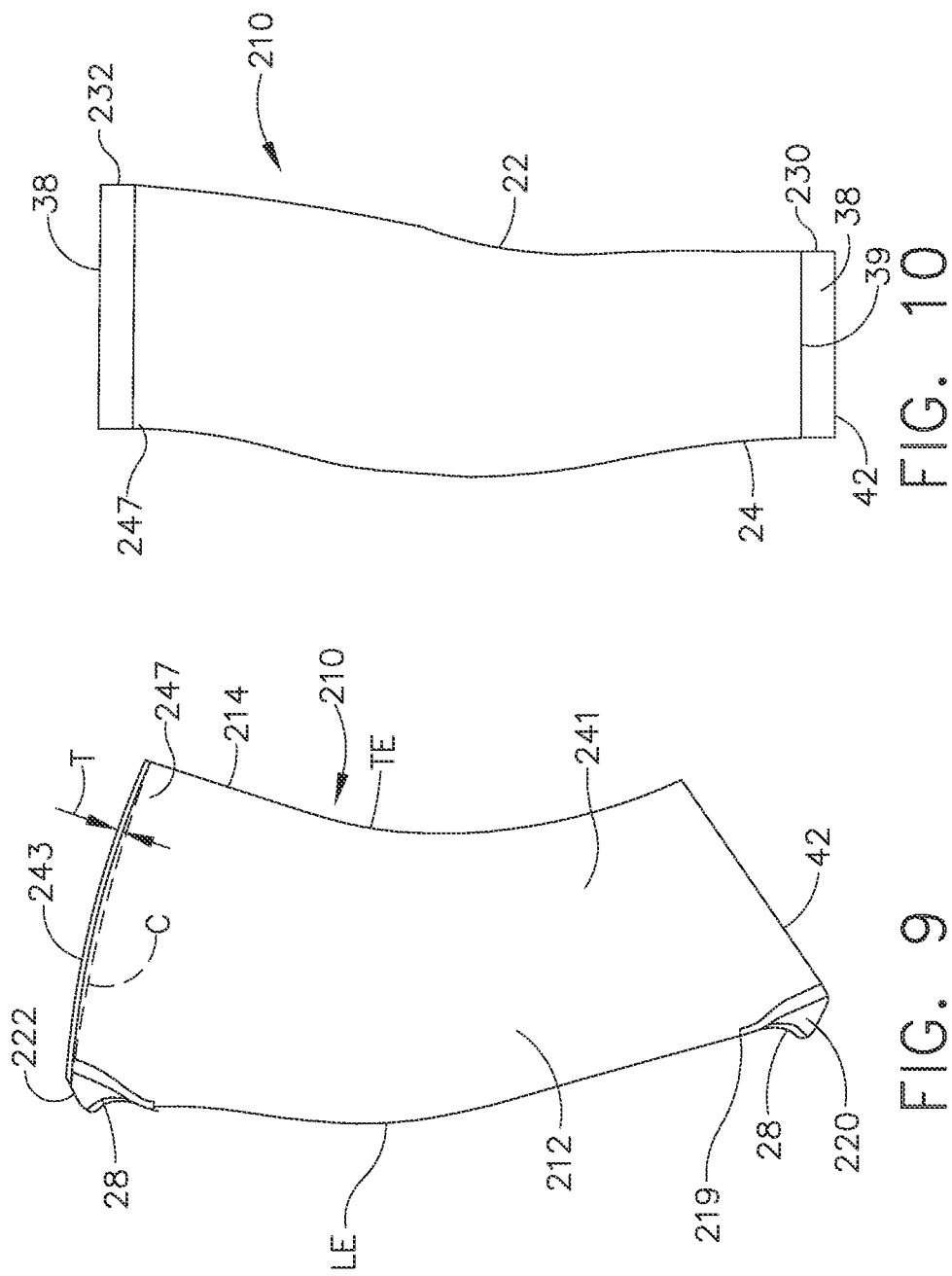

BRAIDED BLADES AND VANES HAVING DOVETAIL ROOTS

BACKGROUND OF THE INVENTION

Field of the Invention

The invention relates to gas turbine engine composite blades and vanes and, particularly, for methods for making such blades and vanes having airfoils and dovetail roots and articles therefrom.

Description of Related Art

Bypass gas turbine engines of the turbofan type generally includes a forward fan and booster compressor, a middle core engine, and an aft low pressure power turbine. A low pressure turbine rotatably drives the fan and booster compressor via a low pressure shaft, all of which form the low pressure rotor. Composite airfoils have been developed for and used in blades and in stator vanes in such fans and booster or low pressure compressors. Such blades and vanes often have airfoils connected to dovetail roots for mounting to rotor or stator portions respectively of the engine.

Three-dimensional (3-D) braiding is a known process for forming fiber preforms by continuous intertwining of fibers. During the 3-D braiding process, a plurality of fiber carriers in a matrix array are moved simultaneously across a carrier surface. A fiber extends from each carrier member and is intertwined with fibers from other carrier members as they are simultaneously moved. The fibers are gathered above the carrier surface by suitable means. The 3-D braiding process is characterized by an absence of planes of delamination in the preform and results in a tough, crack growth resistant composite article when the preform is impregnated with resin (such as epoxy), metal or other known matrix materials. The Bluck U.S. Pat. No. 3,426,804 issued Feb. 11, 1969, and the Florentine U.S. Pat. No. 4,312,761 issued Jan. 26, 1982, illustrate machines for braiding a 3-D article preform using fiber carriers in a rectangular, row-column matrix or circular, concentric-ring matrix.

It is known to manufacture aircraft gas turbine engine blades and vanes having airfoils connected to dovetail roots from composite materials. Composite blades and vanes offer weight reduction which is highly desirable. It is desirable to have a strong blade or vane with a process for making a 3-D braided fiber preform having an airfoil and an integral dovetail root.

It is highly desirable to have a composite blade or vane with at least one integral composite airfoil and vane including a braided material outer layer. It is highly desirable to have a composite blade or vane preform with a braided material outer layer. It is highly desirable to have a method for producing a composite blade or vane preform with a braided material continuous outer layer over the airfoil and dovetail wherein the braiding process is automated and the dovetail provides an attachment feature for high-stress applications.

SUMMARY OF THE INVENTION

A gas turbine engine composite article includes a composite article airfoil attached to an article root and having article blade pressure and suction sides extending outwardly in a spanwise direction from an article airfoil base or the article root to an article airfoil tip. The composite article airfoil extends between chordwise spaced apart article leading and trailing edges and the article root includes an integral article dovetail. A core includes a core airfoil attached to a core root including a core dovetail and the core airfoil includes core pressure and suction sides extending outwardly in the spanwise direction from a core airfoil base or core root to a core tip and is located within the composite article airfoil. A continuous outer three-dimensional (3-D) braided layer including braided composite material tows is braided on the core and covers the entire core airfoil and the core root.

The core may include an inflatable mandrel. The core may be a composite core made of a composite material. Pad-up or insert plies may be disposed inboard of the braided layer. The core may include stiffeners having an I beam or hollow rectangular cross-section box beams. Hollow space between the beams and a shell of the blade composite core may be filled with a lightweight filler or foam.

The composite article airfoil may extend outwardly in a spanwise direction from an article inner root to an article outer root at the article airfoil tip, the core may include core inner and outer roots integrally formed with the core airfoil, and the continuous outer three-dimensional (3-D) braided layer may cover the entire core airfoil and the core inner and outer roots.

A method for making a gas turbine engine composite article includes braiding a continuous outer three-dimensional (3-D) braided layer including braided composite material tows on a core, the core includes a core airfoil attached to a core root, and the core root includes a core dovetail. The core airfoil includes core pressure and suction sides extending outwardly in the spanwise direction from a core airfoil base or core root to a core tip and is located within the composite article airfoil. The braiding includes covering the entire core airfoil and the core root with the continuous outer three-dimensional (3-D) braided layer.

The braiding may include over-braiding for making top and bottom over-braid portions of the continuous outer braided layer. The method may further include trimming away the top and bottom over-braid portions, then injecting resin in the braided layer, and then curing the composite article. The core may be removed before or after the curing or remain within the part.

BRIEF DESCRIPTION OF THE DRAWINGS

The foregoing aspects and other features of the invention are explained in the following description, taken in connection with the accompanying drawings where:

FIG. 7 is a cross-sectional view illustration of a preform with a first alternative core for making the composite blade illustrated in FIG. 1.

FIG. 8 is a cross-sectional view illustration of a preform with a second alternative core for making the composite blade illustrated in FIG. 1.

FIG. 9 is a perspective view illustration of a composite blade or vane with inner and outer dovetail roots.

FIG. 10 is a cross-sectional view illustration of a core for making the composite vane or blade illustrated in FIG. 9.

DETAILED DESCRIPTION OF THE INVENTION

Figure 1:
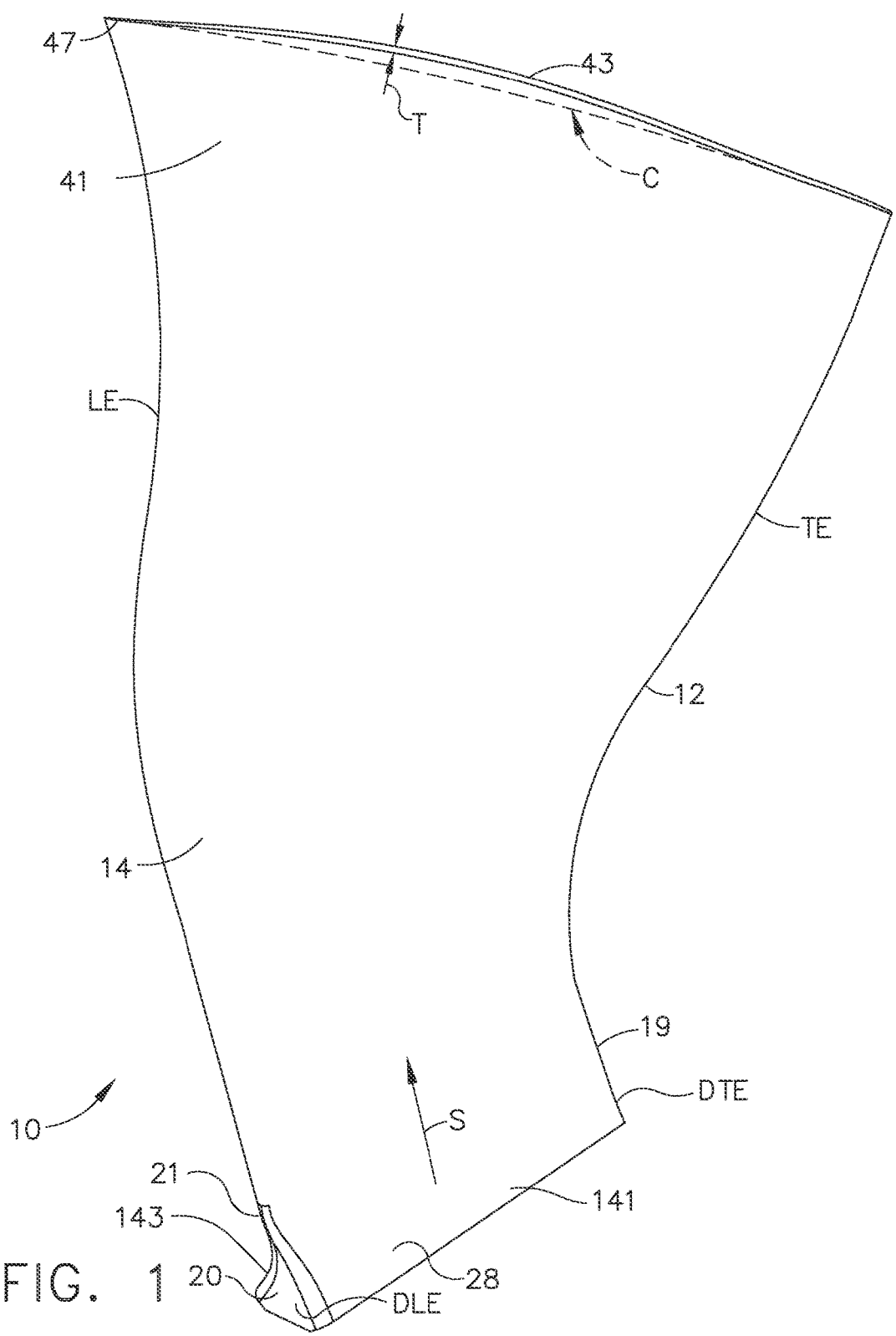
FIG. 1 is a perspective view illustration of a composite blade having an integral airfoil and dovetail root with a continuous outer braided layer.
Figure 6:
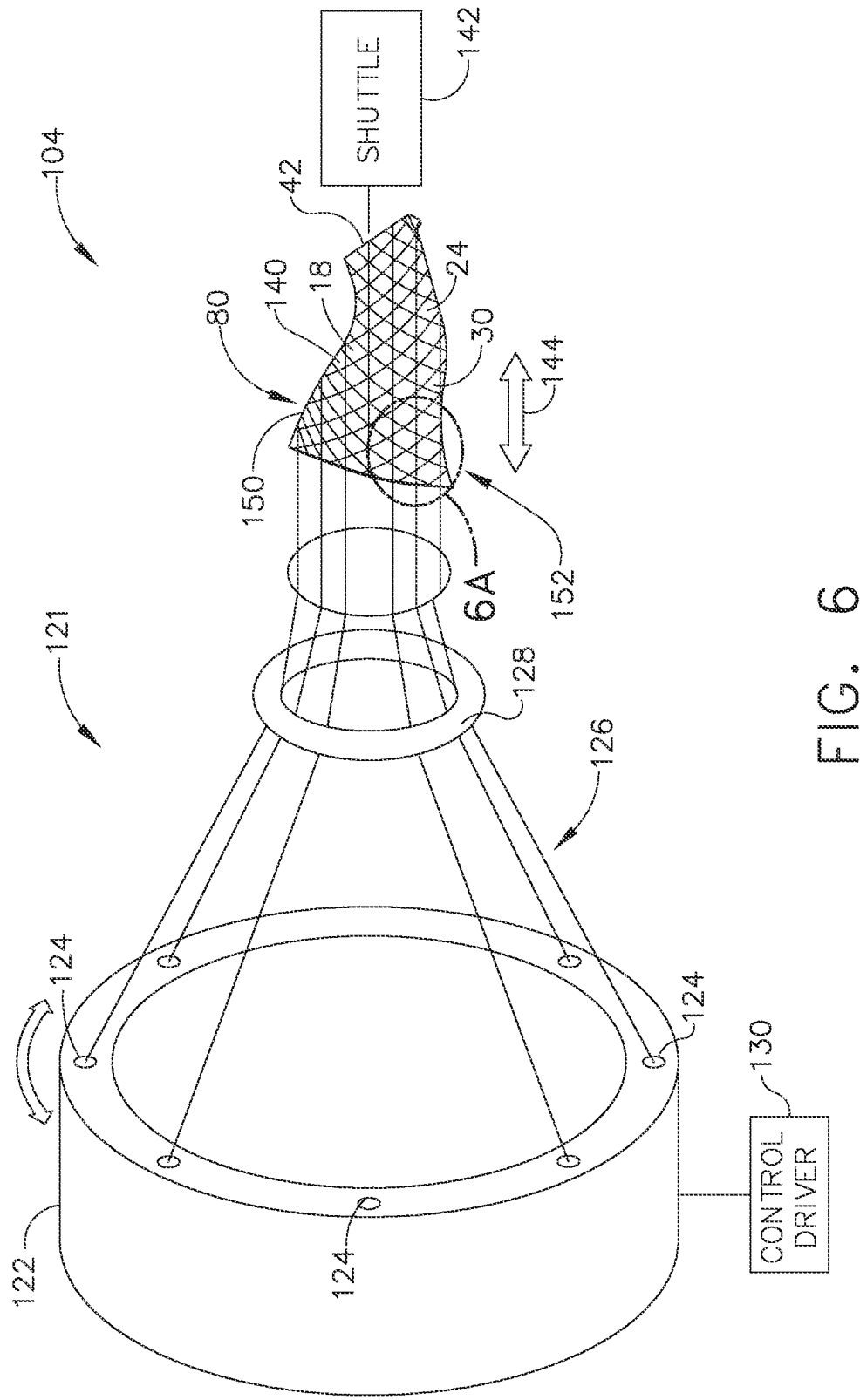
FIG. 6 is a diagrammatical perspective view illustration of a braiding machine and method of braiding the mandrel to form the preform illustrated in FIG. 3.

Illustrated in FIG. 1 is a gas turbine engine rotatable blade 10 having a composite blade airfoil 12 integrally formed with a blade root 20. The blade root 20 may include a blade shank 21 between the composite blade airfoil 12 and the blade root 20. The blade 10 has a continuous outer three-dimensional (3-D) braided layer 14 made at least in part by braiding composite material tows 126 on a core 24 which may be an inflatable mandrel 18 or a blade composite core 30 as illustrated in FIG. 6. The braiding is illustrated in FIG. 6. Note that a blade and method for making the blade is described herein, however, the article and method for making the article also applies to a vane having a composite airfoil integrally formed with a root.

Referring to FIG. 1, the blade airfoil 12 includes blade pressure and suction sides 41, 43 extending outwardly in a spanwise direction S from the blade airfoil base 19 or blade root 20 along a span S to a blade airfoil tip 47. The exemplary blade pressure and suction sides 41, 43 illustrated herein are concave and convex respectively. The blade airfoil 12 extends along a chord C between chordwise spaced apart blade leading and trailing edges LE, TE. Thickness T of the blade airfoil 12 varies in both chordwise and spanwise directions C, S and extends between the blade pressure and suction sides 41, 43. The blade root 20 includes an integral blade dovetail 28 for mounting the blade 10 to a gas turbine engine rotor disk or drum.

The blade dovetail 28 includes dovetail pressure and suction sides 141, 143 corresponding to the blade pressure and suction sides 41, 43 respectively. The blade dovetail 28 further includes dovetail leading and trailing edges DLE, DTE corresponding to the blade leading and trailing edges LE, TE respectively.

Figure 2:
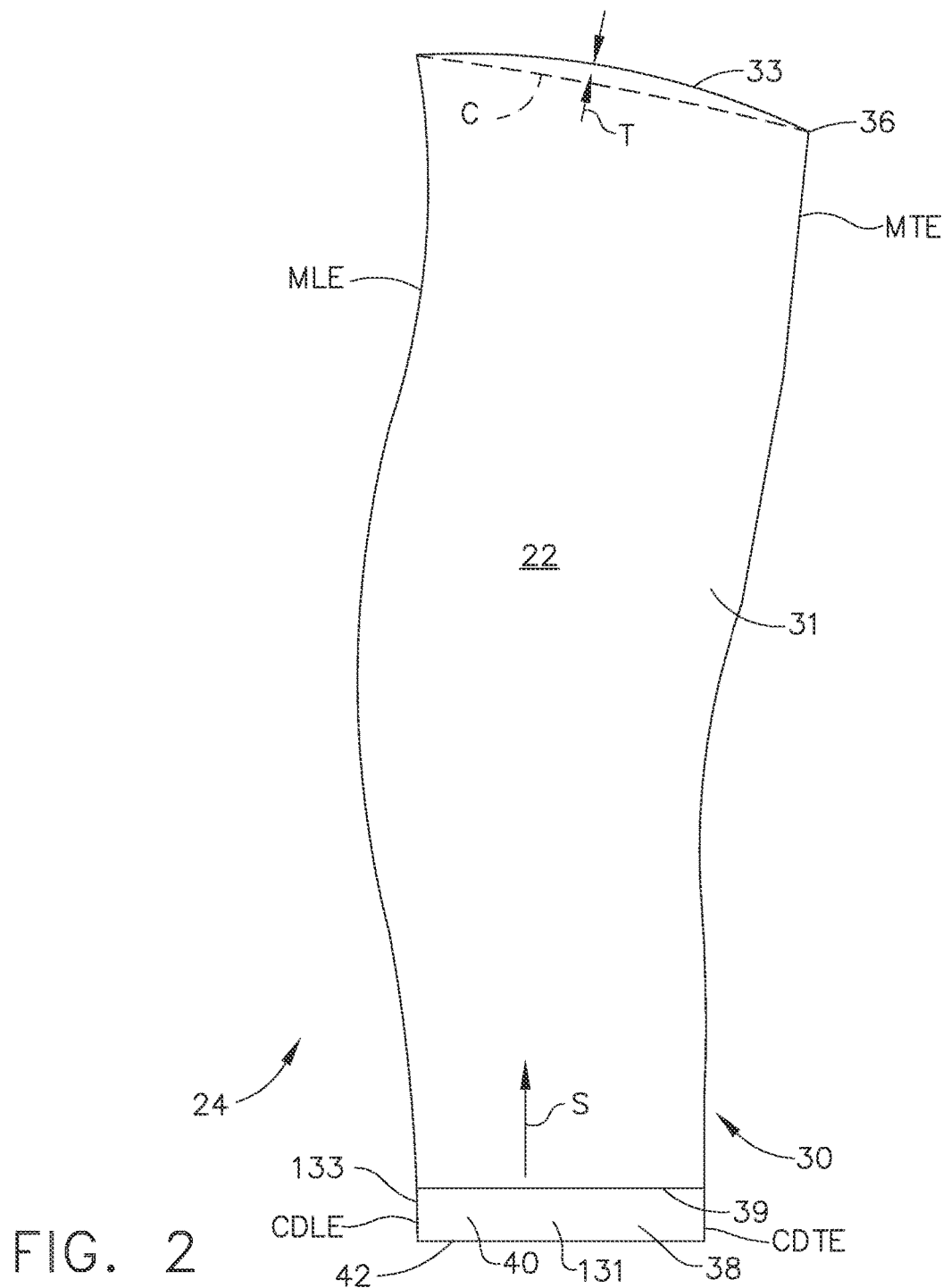
FIG. 2 is a cross-sectional view illustration of a composite core or mandrel for braiding a continuous outer braided layer for the integral airfoil and dovetail root illustrated in FIG. 1.
Figure 3:
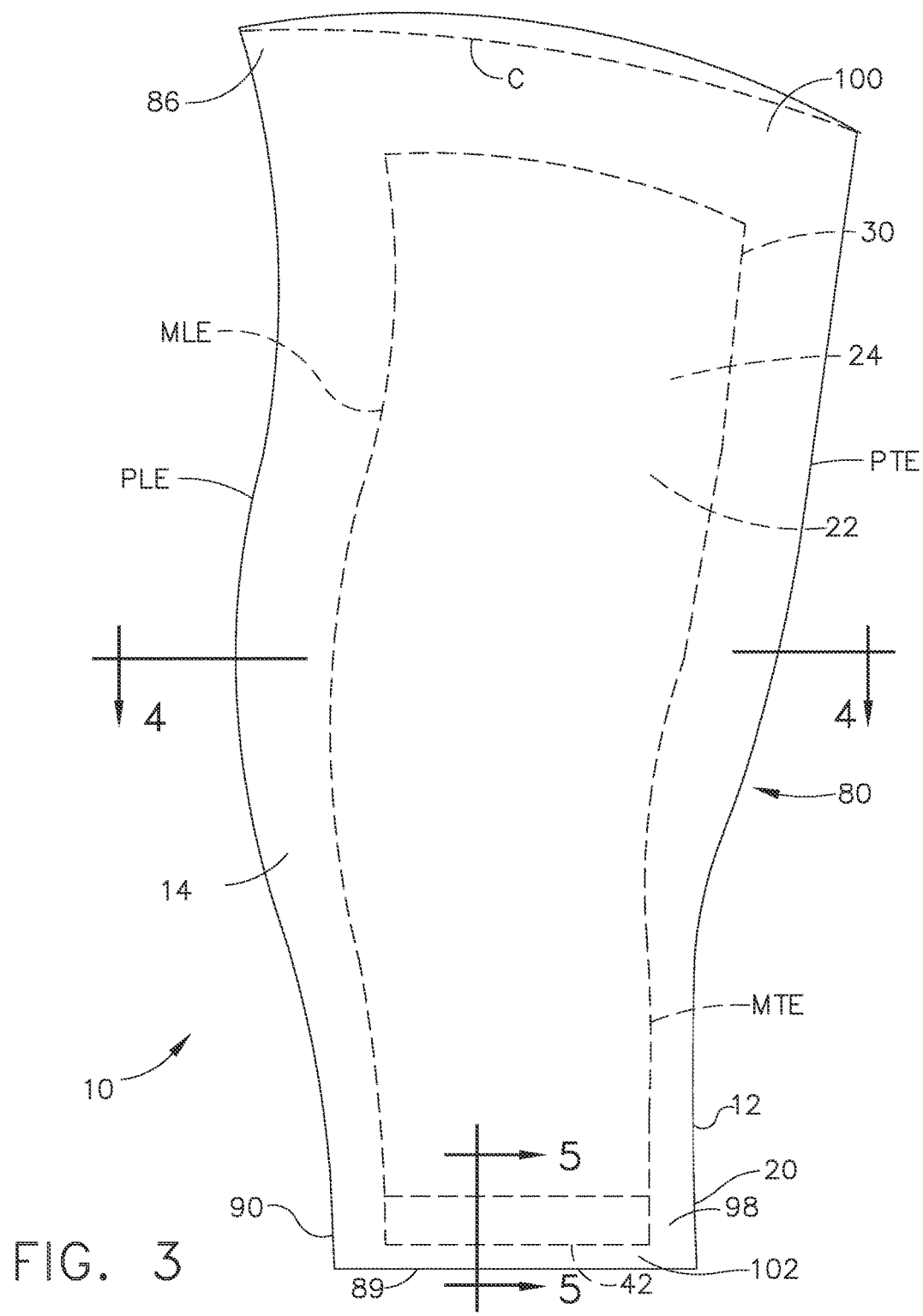
FIG. 3 is a cross-sectional view illustration of a preform for making the composite blade illustrated in FIG. 1.
Figure 4:
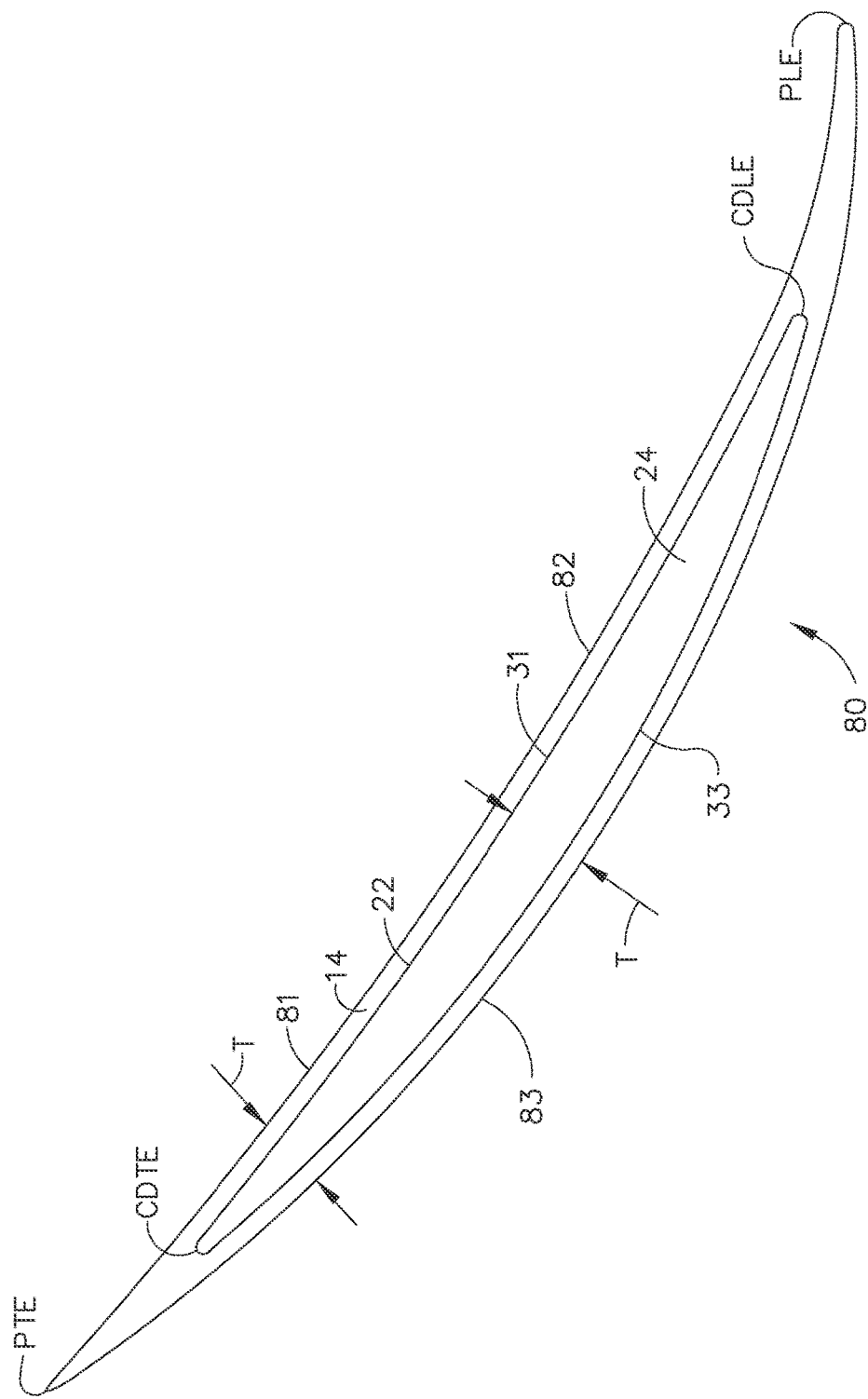
FIG. 4 is a cross-sectional view illustration through an airfoil section of the preform through 4-4 in FIG. 3.

Illustrated in FIGS. 2-4 is the core 24 (which may be the blade composite core 30) that operates as and represents the mandrel 18 as used during the method of making the blade. In the case of a blade composite core 30, it may remain inside the blade 10 when the process or method is finished. In such an embodiment, the blade composite core 30 serves as the mandrel 18 during the braiding process illustrated in FIG. 6. The core 24 includes a core airfoil 22 having core pressure and suction sides 31, 33 extending outwardly in a spanwise direction from a core airfoil base 39 or core root 40 along a core span S to a core tip 36. The core root 40 includes a core dovetail 38. The exemplary core pressure and suction sides 31, 33 illustrated herein are concave and convex respectively. The core airfoil 22 extends along a chord C between chordwise spaced apart core leading and trailing edges MLE, MTE. Thickness T of the core airfoil 22 varies in both chordwise and spanwise directions C, S and extends between the core pressure and suction sides 31, 33.

Referring to FIGS. 2-5, the core dovetail 38 includes core dovetail pressure and suction sides 131, 133 corresponding to the core pressure and suction sides 31, 33 respectively. The core dovetail 38 further includes core dovetail leading and trailing edges CDLE, CDTE corresponding to the core leading and trailing edges MLE, MTE respectively. The core dovetail 38 includes a core dovetail bottom 42.

Figure 5:
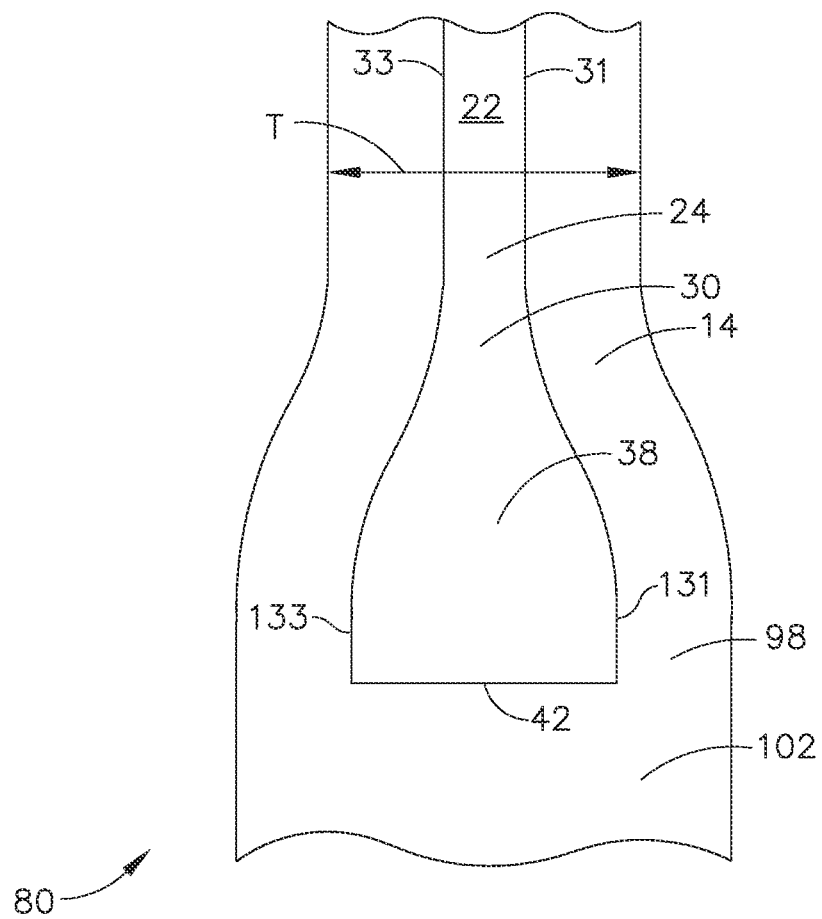
FIG. 5 is a cross-sectional view illustration through a root section of the preform through 5-5 in FIG. 3.

Illustrated in FIGS. 3-5 is a preform 80 formed by the braiding process illustrated in FIG. 6. The core 24 (which may be the mandrel 18 or blade composite core 30) is illustrated disposed within the preform 80 in dashed line for comparison purposes. The preform 80 includes a preform airfoil 82 having preform pressure and suction sides 81, 83 extending outwardly in a spanwise direction from a preform airfoil base 89 or preform root 90 along a preform span S to a preform tip 86. The preform root 90 includes a preform dovetail 98. The exemplary preform pressure and suction sides 81, 83 illustrated herein are concave and convex respectively. The preform airfoil 82 extends along a chord C between chordwise spaced apart preform leading and trailing edges PLE, PTE. Thickness T of the preform airfoil 82 varies in both chordwise and spanwise directions C, S and extends between the preform pressure and suction sides 81, 83. The braiding process includes over-braiding for making top and bottom over-braid portions 100, 102 of the continuous outer braided layer 14 which can be trimmed away from the rest of the preform 80 before injection with resin. Two exemplary injection processes may be resin transfer molding RTM or vacuum assisted resin transfer molding VARTM or other resin injection process. After injection, the preform 80 is cured such as by autoclaving, heated press, or another curing process.

Illustrated in FIGS. 4-5 is a preform 80 with a solid blade composite core 30 disposed within the preform 80 and surrounded by the continuous outer braided layer 14. FIG. 4 is taken through a chordwise extending plane of the blade airfoil 12 and the composite core airfoil 22 which is illustrated in FIGS. 4-5 as being solid. FIG. 5 illustrates the preform root 90 as being solid and part of the solid blade composite core 30 disposed within the preform 80 and surrounded by the continuous outer braided layer 14. FIG. 5 also further illustrates the bottom over-braid portion 102 and the preform root 90 and the preform dovetail 98. The solid blade composite core 30 may be made from unitape or fabrix.

Unitape is a unidirectional tape material and an epoxy resin matrix. A discussion of this and other suitable materials may be found in the "Engineering Materials Handbook" by ASM INTERNATIONAL, 1987 1989 or later editions. The composite materials discussed herein are made from the non-metallic type made of a material containing a fiber such as a carbonaceous, silica, metal, metal oxide, or ceramic fiber embedded in a resin material such as Epoxy, PMR15, BMI, PEED, Silicon, etc. The fibers are unidirectionally aligned in a tape that is impregnated with a resin and formed into a part shape. Later, it is cured via an autoclaving process or press molding to form a light weight, stiff, relatively homogeneous article having laminates or plys within. The plies are generally all made from a unidirectional fiber filament ply material, preferably a tape, as it is often referred to, arranged generally in order of span and used to form the core airfoil 22. A ply lay up disclosed in U.S. Pat. No. 5,375,978 is referred to as a standard quasi isotropic lay up sequence of 0. degree, +45 degree, 0 degree, 45 degree fiber orientations with the plies having the numerous ply shapes.

Illustrated in FIGS. 7-8 are first and second alternative constructions respectively for the blade composite core 30. The blade composite cores 30 illustrated in FIGS. 7-8 are hollow and have stiffeners 110. The stiffener illustrated in FIG. 7 is an I beam 112 and the stiffener illustrated in FIG. 8 includes hollow square or rectangular cross-section box beams 114. A hollow space 118 between the beams and a shell 120 of the blade composite core 30 may be filled with a filler such as foam often used in composite articles such as blades and vanes.

The blade composite core 30 may include, but is not limited to, wash out material or flyaway composite material, or a pre-cured composite material. Washout material is chemically removed from the blade or the preform. Flyaway material remains in the blade when it is finished being manufactured and is installed in the engine where it remains during engine operation. If the core 24 is an inflatable mandrel then the inflatable mandrel can be removed before or after curing. The blade can include additional non-braided features such as pad-up or insert plies or stiffening elements which are disposed inboard of the braided layer. The insert plies may be used to build up the root area between the core and the braided layer.

Figure 6A:
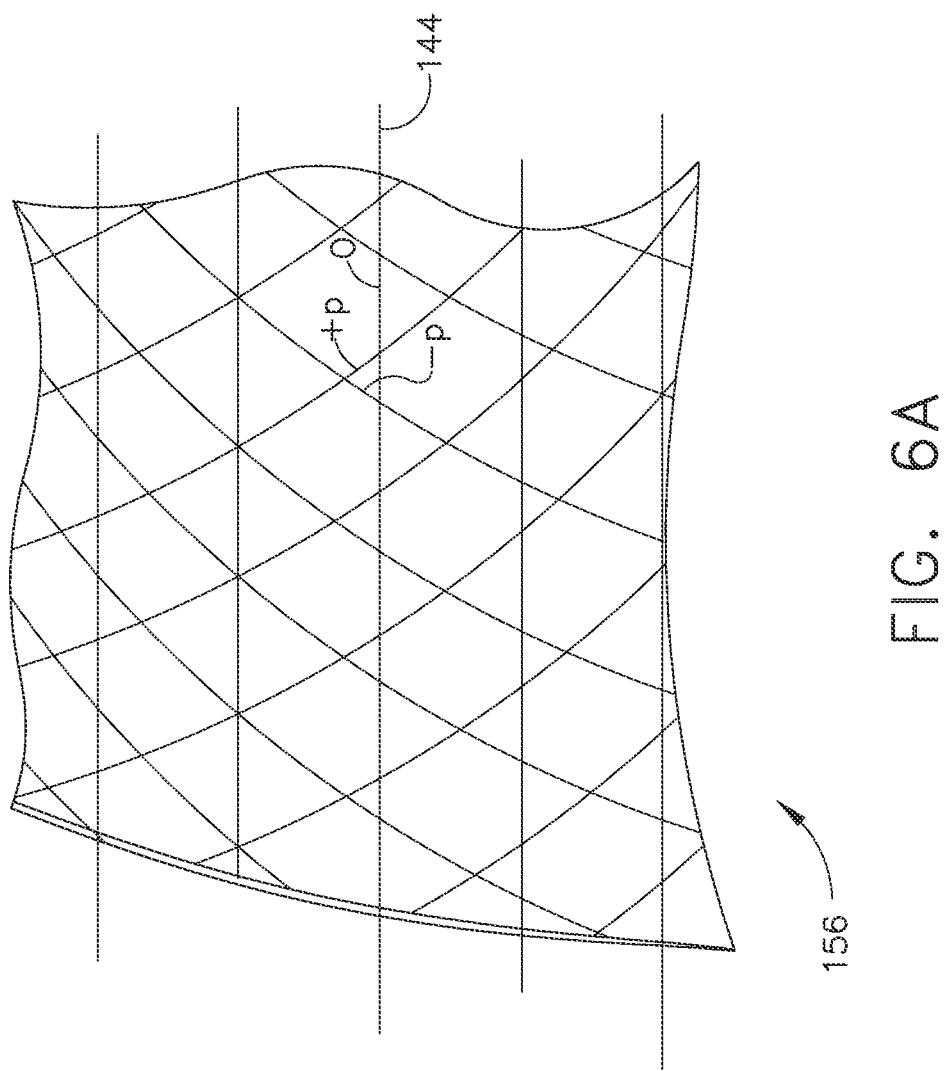
FIG. 6A is an enlarged diagrammatical perspective view illustration of a tri-axial weave of fiber tows illustrated in FIG. 6.

FIGS. 6 and 6A illustrates a braiding apparatus 104 and method for manufacturing a non-uniform thickness composite blade preform such as preform 80 illustrated in FIGS. 3-5. A braiding apparatus is disclosed in U.S. Pat. No. 8,061,253 by Wybrow, which issued Nov. 22, 2011, entitled "Composite Spars", and which is incorporated herein by reference in its entirety. The apparatus 104 includes a braiding machine 121, a variable position shuttle 142 and a non-cylindrical mandrel 140 such as the inflatable mandrel or core described above. An exemplary braiding machine is a Herzog™ RF1/192-100 braiding machine available from Herzog Maschinenfabrik GmbH & Co. KG, Am Alexanderhaus 160, D-26127, Oldenburg, Germany [9].

The braiding machine 121 includes a rotatable drum 122 upon which a plurality of bobbins 124 are mounted. Only eight such bobbins 124 are illustrated for clarity reasons. In practice, however, many more such bobbins may be provided. In operation, the rotatable drum 122 is driven to rotate about a cylindrical axis 144 by a controller/driver device 130, which may include an electric motor operated under the control of a computerized control system (not shown). The bobbins 124 move independently on carriers in an S-shaped pattern around the circumference of the core 24 moving from one carrier to the next. The bobbins 124 are loaded with various fiber containing tows 126 which are braided to produce a non-uniform thickness composite component 152 such as the composite preform 80 illustrated in FIGS. 3-5.

The fiber tows 126 are threaded through a braiding guide 128 and temporarily affixed to the non-cylindrical mandrel 140 or the core 24. The non-cylindrical mandrel 140 or the core 24 is coupled to the variable position shuttle 142, such that when the variable position shuttle 142 is operated, the relative position of the non-cylindrical mandrel 140 or core moves laterally with respect to the braiding machine 121 along the direction of the axis 144. The shuttle 142 is attached to the core dovetail bottom 42. The non-cylindrical mandrel 140 or core is made of a material that is suitably light and stiff such that it can be supported at each end without bending.

During operation, as the rotatable drum 122 rotates, the non-cylindrical mandrel 140 or core 24 is moved laterally along the cylindrical axis 144 and the fiber tows 126 are braided together over the surface of the non-cylindrical mandrel 140 or core 24 to form braided plys 150 to form the braided layer 14. This process may be repeated by over-braiding one or more additional layers of the blade braided ply layers, for example, whilst moving the non-cylindrical mandrel 140 or core 24 in an opposite direction. By moving the non-cylindrical mandrel, for example, at a constant speed along the cylindrical axis 144 whilst depositing fiber tows 126 also at a constant speed, the blade braided ply 150 is imparted with a varying thickness along its length in the direction of the cylindrical axis 144 due to the variation in the radial dimensions of the non-cylindrical mandrel. This allows a non-uniform thickness blade braided ply 150 to be produced.

The braided ply might comprise a tri-axial weave 156, as illustrated in FIG. 6A, in which fiber tows 126 are disposed at braid angles +P, 0, and −P degrees such as +45. degrees. 0. degrees, and −45. degrees with respect to the cylindrical axis 144 in order to provide optimal torsional strength.

The continuous outer three-dimensional (3-D) braided layer 14 is layed down by braiding the composite material tows 126 on the core 24 including the entire core airfoil 22 and its core pressure and suction sides 31, 33 down to the core root 40 and covering the core dovetail pressure and suction sides 131, 133 and the core dovetail leading and trailing edges CDLE, CDTE. The braiding includes overbraiding on top and bottom to form the top and bottom over-braid portions 100, 102.

FIG. 9 illustrates a composite aircraft gas turbine engine vane or rotatable blade 210 having a composite blade airfoil 212 integrally formed with blade inner and outer roots 220, 222. The vane or blade 210 has a continuous outer three-dimensional (3-D) braided layer 214 made in part by braiding composite material tows on a composite core as illustrated in FIG. 6. The blade airfoil 212 includes blade pressure and suction sides 241, 243 extending outwardly in a spanwise direction from a blade airfoil base 219 or the blade inner root 220 along a span S to a blade airfoil tip 247 or the blade outer root 222 at the blade airfoil tip 247. The exemplary blade pressure and suction sides 241, 243 illustrated herein are concave and convex respectively. The airfoil 212 extends along a chord C between chordwise spaced apart vane or blade leading and trailing edges LE, TE. Thickness T of the airfoil 212 varies in both chordwise and spanwise directions C, S and extends between the pressure and suction sides 241, 243. Each of the inner and outer roots 220, 222 include an integral blade dovetail 28 that enables the vane or blade to be mounted to a gas turbine engine rotor disk or drum or in the case of a vane to static structure of the engine.

Referring to FIG. 10, the composite aircraft gas turbine engine vane or rotatable blade 210 includes the core 24 and the core airfoil 22 as described above but has core inner and outer roots 230, 232 integrally formed with or attached to the core airfoil 22. Each of the core inner and outer roots 230, 232 includes a core dovetail 38. The core dovetail 38 of the core outer root 232 is located at the blade airfoil tip 247. The core dovetail 38 of the core inner root 220 is located at the core airfoil base 39 of the base core airfoil 22 and includes the core dovetail bottom 42 to which the shuttle can be attached.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine composite article comprising:
a composite article airfoil attached to an article inner root and an article outer root,
the composite article airfoil including article blade pressure and suction sides extending outwardly in a spanwise direction from an article airfoil base or the article inner root to the article outer root at an article airfoil tip,
the composite article airfoil extending between chordwise spaced apart article leading and trailing edges,
at least one of the article inner root or the article outer root including an integral article dovetail,
a core including a core airfoil integrally formed to a core inner root and a core outer root, at least one of the core inner root or the core outer root including a core dovetail,
the core airfoil including core pressure and suction sides extending outwardly in the spanwise direction from a core airfoil base or the core inner root to the core outer root at a core tip and located within the composite article airfoil,
a continuous outer three-dimensional braided layer including braided composite material tows braided on the core, and
the continuous outer three-dimensional braided layer covering the entire core airfoil, the core inner root, and the core outer root.

2. The article as claimed in claim 1 further comprising the core including an inflatable mandrel.

3. The article as claimed in claim 1 further comprising the core being a composite core made of a composite material.

4. The article as claimed in claim 3 further comprising pad up or insert plies disposed inboard of the continuous outer three-dimensional braided layer.

5. The article as claimed in claim 3 further comprising the core including stiffeners.

6. The article as claimed in claim 5, wherein the stiffeners comprise an I beam or hollow rectangular cross-section box beams.

7. The article as claimed in claim 6 further comprising a hollow space between the I beam or hollow rectangular cross-section box beams and a shell of the blade composite core filled with a filler or foam.

8. The article as claimed in claim 1 further comprising:
the core being a composite core made of a composite material,
the core including stiffeners, and
the stiffeners including an I beam or hollow rectangular cross-section box beams.

9. The article as claimed in claim 8 further comprising a hollow space between the I beam or hollow rectangular cross-section box beams and a shell of the blade composite core filled with a filler or foam.

10. The article as claimed in claim 1, wherein the article inner root includes an integral article dovetail.

11. The article as claimed in claim 10, wherein the article outer root includes an integral article dovetail.

12. The article as claimed in claim 10, wherein the core outer root and core inner root each include a core dovetail.

13. The article as claimed in claim 1, wherein the core inner root includes a core dovetail.

14. The article as claimed in claim 13, wherein the core outer root includes a core dovetail.

* * * * *